(12) United States Patent
Ono et al.

(10) Patent No.: US 10,882,775 B2
(45) Date of Patent: Jan. 5, 2021

(54) GLASS SUBSTRATE

(71) Applicant: AGC INC., Chiyoda-ku (JP)

(72) Inventors: Yoshitaka Ono, Tokyo (JP); Nobuaki Ikawa, Tokyo (JP); Motoichi Iga, Tokyo (JP); Masaya Kunigita, Tokyo (JP)

(73) Assignee: AGC INC., Chiyoda-ku (JP)

( * ) Notice: Subject to any disclaimer, the term of this patent is extended or adjusted under 35 U.S.C. 154(b) by 250 days.

(21) Appl. No.: 16/059,525

(22) Filed: Aug. 9, 2018

(65) Prior Publication Data

US 2019/0047892 A1 Feb. 14, 2019

(30) Foreign Application Priority Data

Aug. 10, 2017 (JP) .................................. 2017-155468
Jul. 24, 2018 (JP) .................................. 2018-138799

(51) Int. Cl.
*C03B 17/06* (2006.01)
*C03C 15/00* (2006.01)
*C03B 25/08* (2006.01)
*C03B 18/22* (2006.01)
*C03C 3/087* (2006.01)
*C03C 3/093* (2006.01)

(52) U.S. Cl.
CPC ............ *C03B 17/064* (2013.01); *C03B 18/22* (2013.01); *C03B 25/08* (2013.01); *C03C 15/00* (2013.01); *C03C 3/087* (2013.01); *C03C 3/093* (2013.01); *C03C 2204/08* (2013.01)

(58) Field of Classification Search
CPC ..................................................... C03B 17/064
USPC .......................................................... 428/57
See application file for complete search history.

(56) References Cited

U.S. PATENT DOCUMENTS

2011/0045229 A1* 2/2011 Takaya .................... C03C 27/06
428/76

FOREIGN PATENT DOCUMENTS

JP 2009-155136 7/2009

* cited by examiner

*Primary Examiner* — Brent T O'Hern
(74) *Attorney, Agent, or Firm* — Oblon, McClelland, Maier & Neustadt, L.L.P.

(57) ABSTRACT

A glass substrate comprising a rectangular glass sheet having a first main surface and a second main surface opposite the first main surface, the glass substrate having a first side and a second side which are adjacent to each other in a view along a thickness direction of the glass sheet, in which a thickness tolerance is less than 6.26 μm in a first cross section which is a cross section in the thickness direction of the glass sheet along a straight line parallel to the first side, the thickness tolerance being a difference between the maximum value and the minimum value of the thickness of the glass sheet.

22 Claims, 15 Drawing Sheets

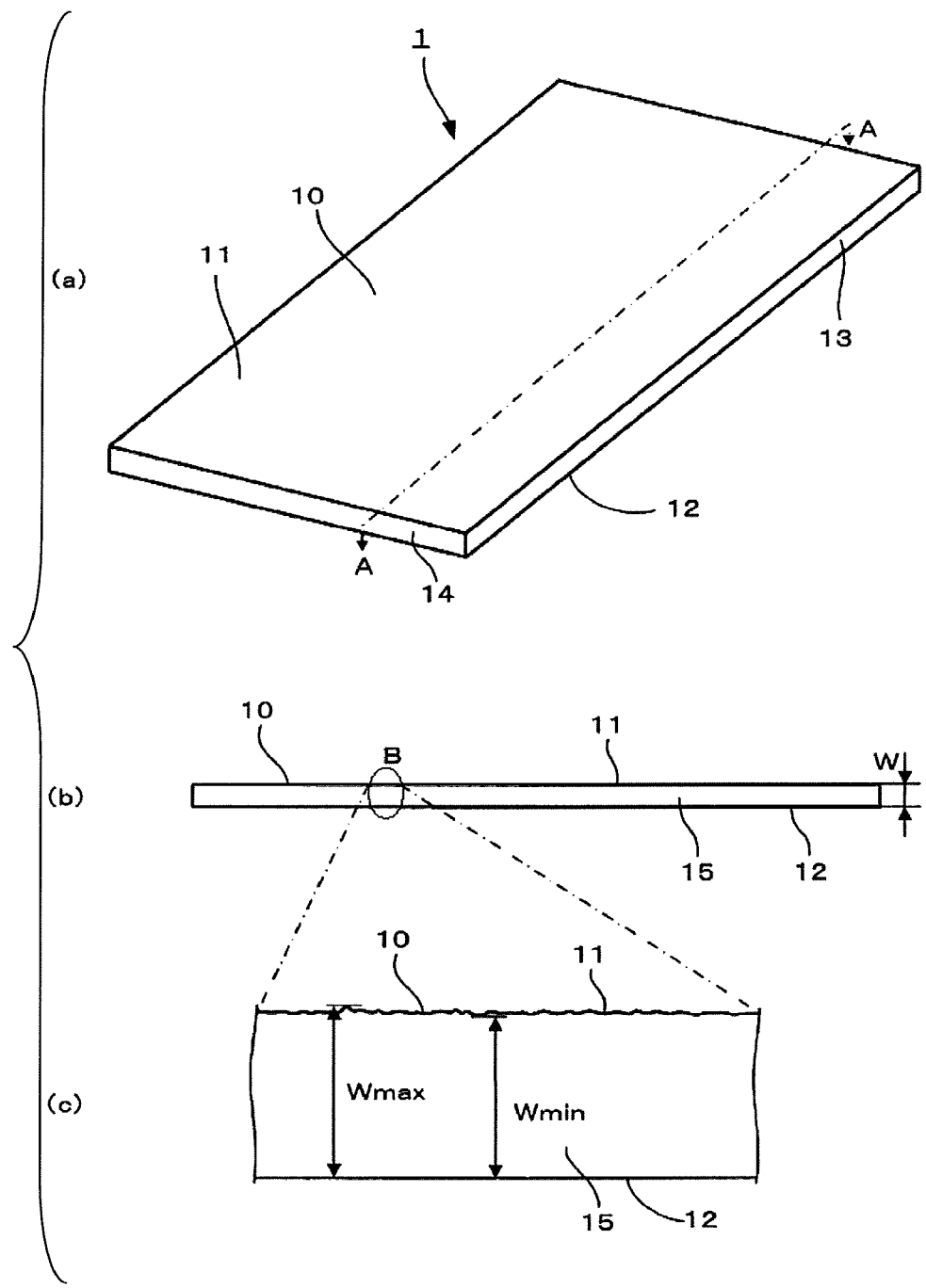
[Fig. 1]

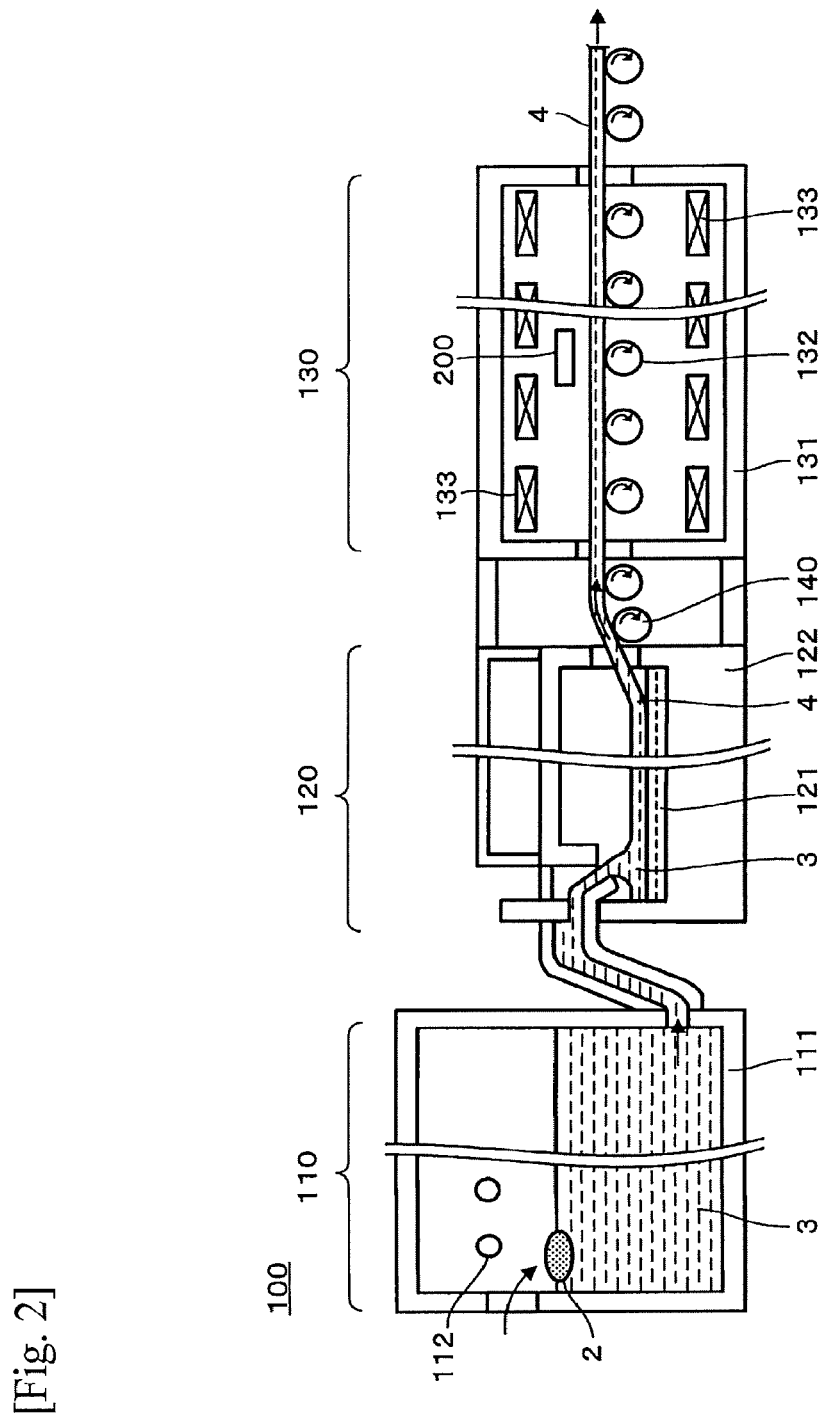
[Fig. 2]

[Fig. 3]
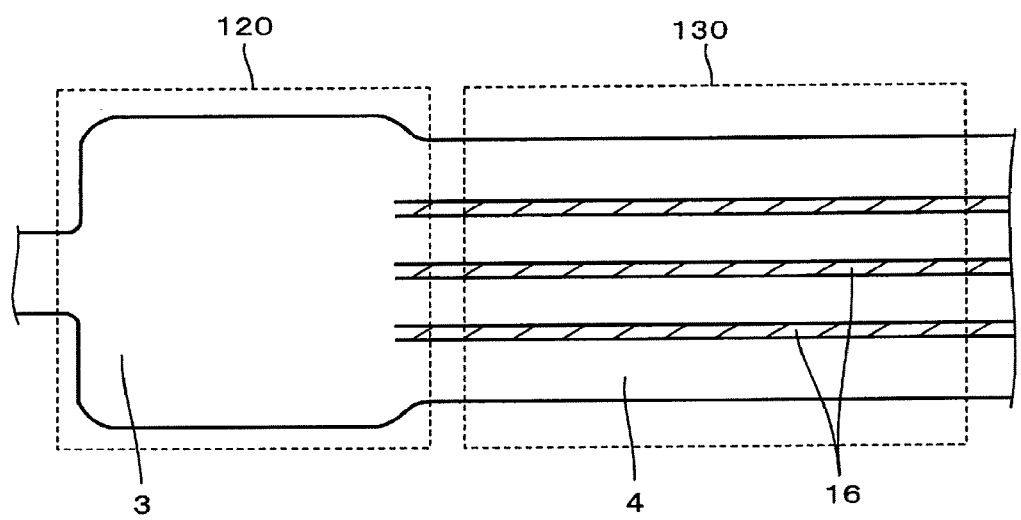

[Fig. 4]
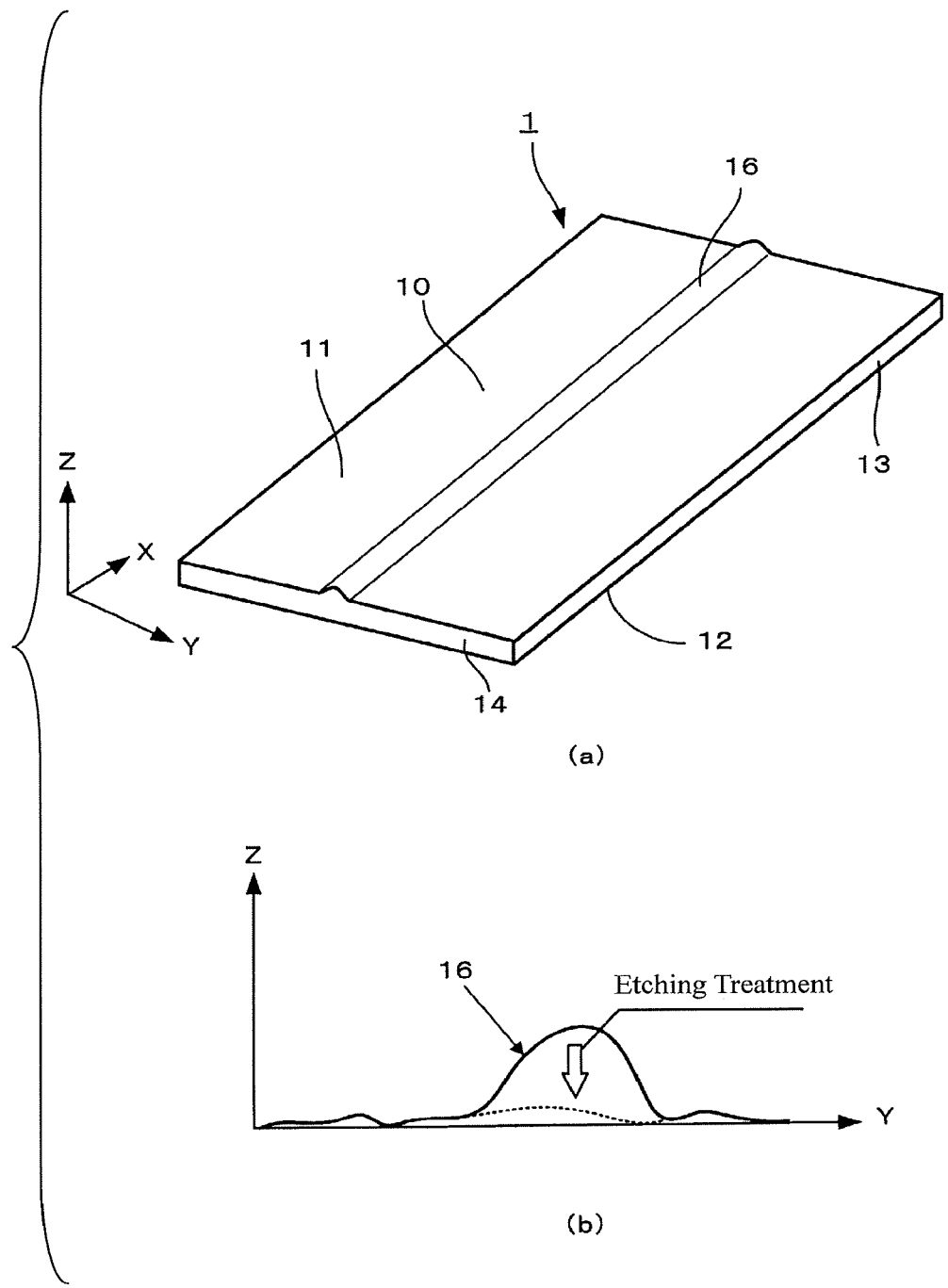
(a)
(b)

[Fig. 5]
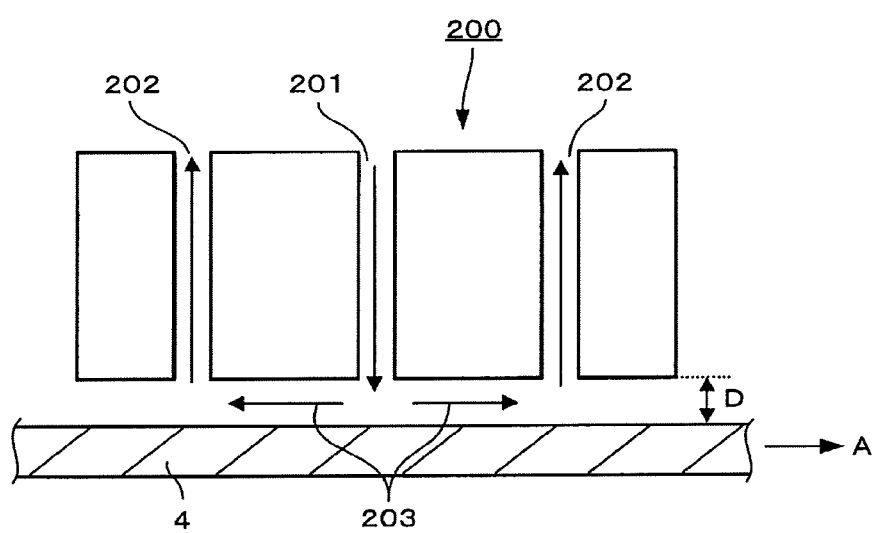

[Fig. 6]
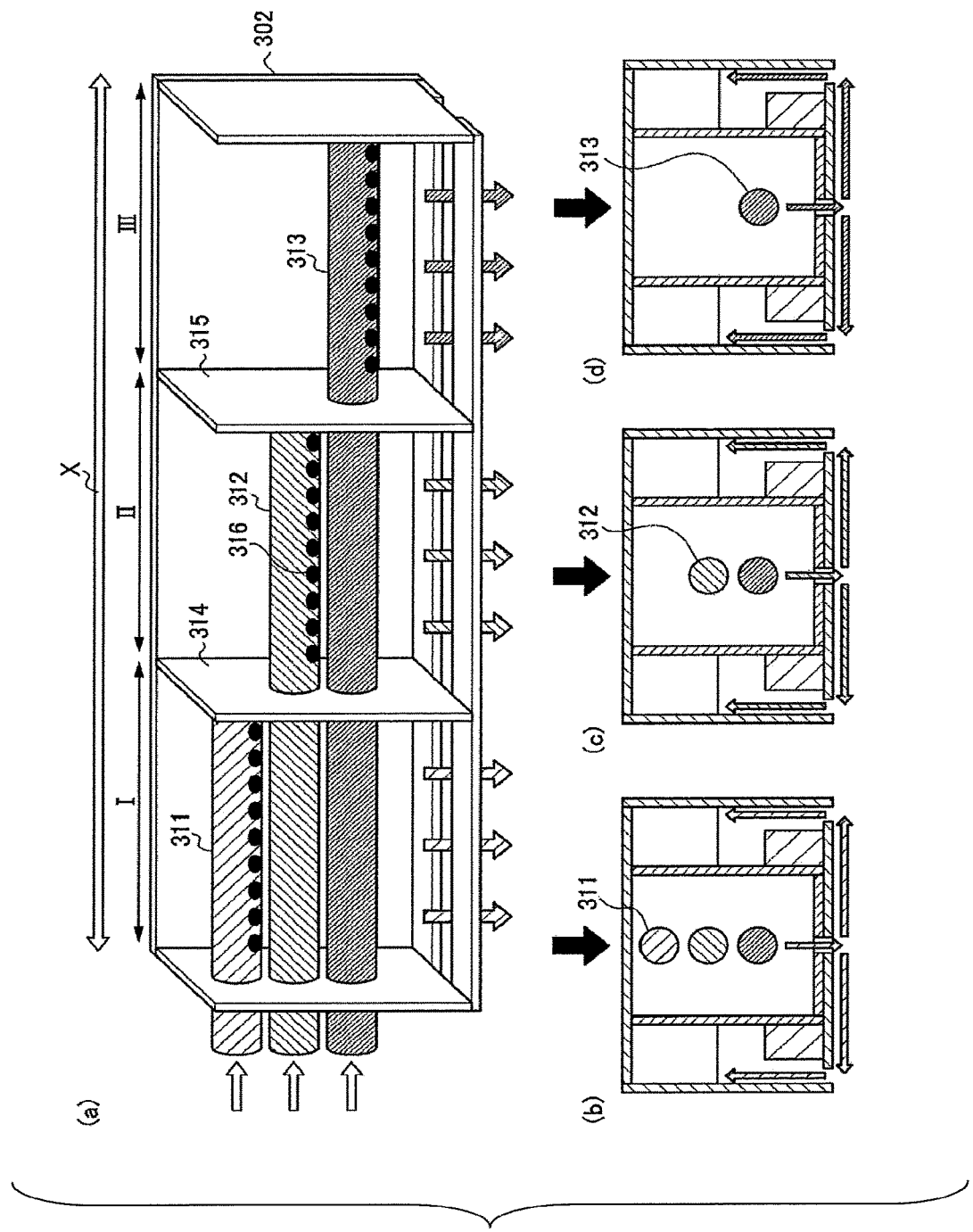

[Fig. 7]
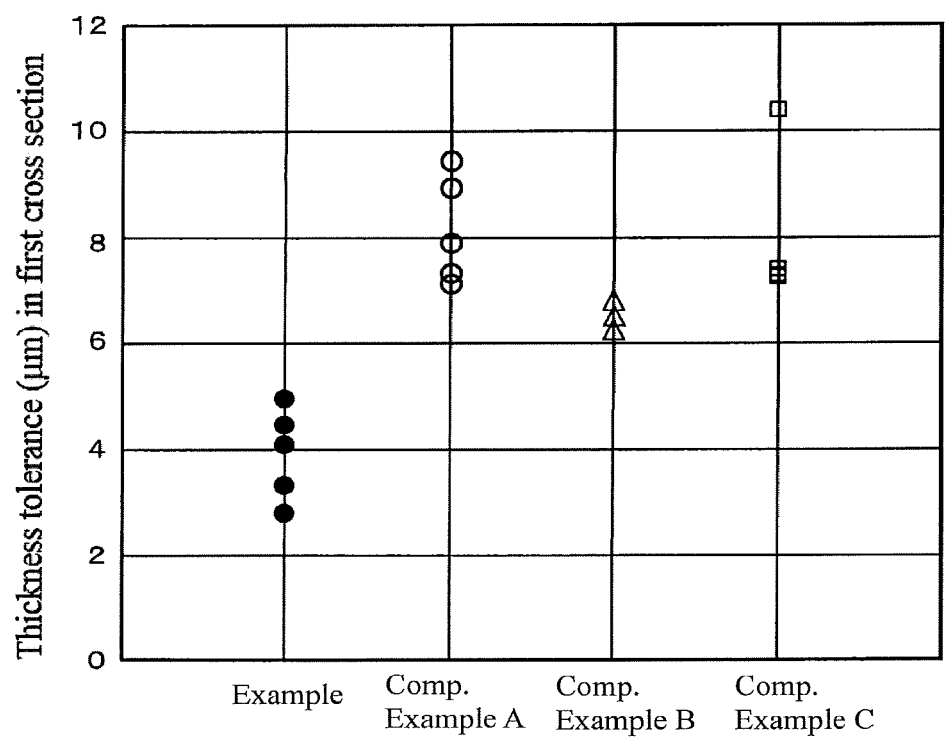

[Fig. 8]
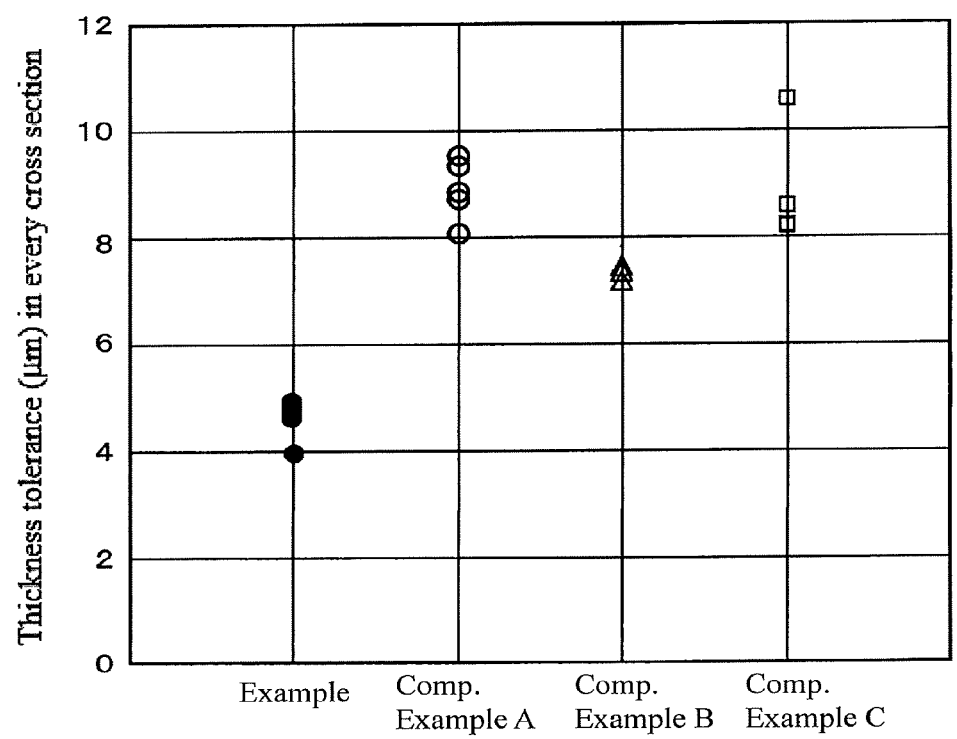

[Fig. 9]
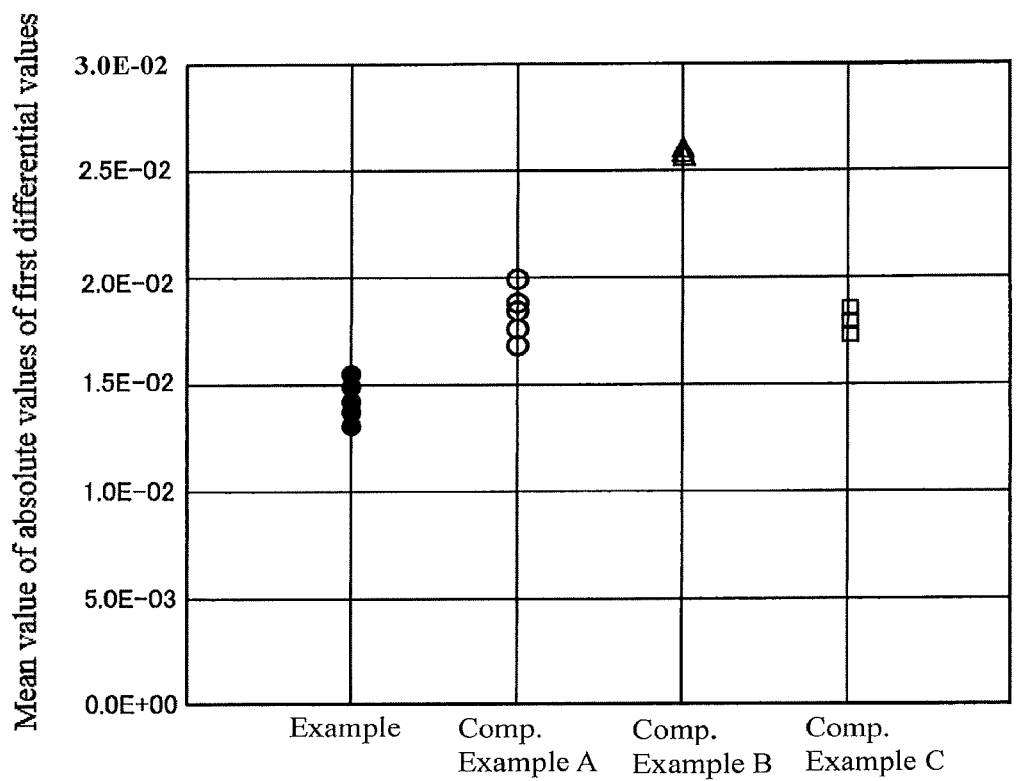

[Fig. 10]
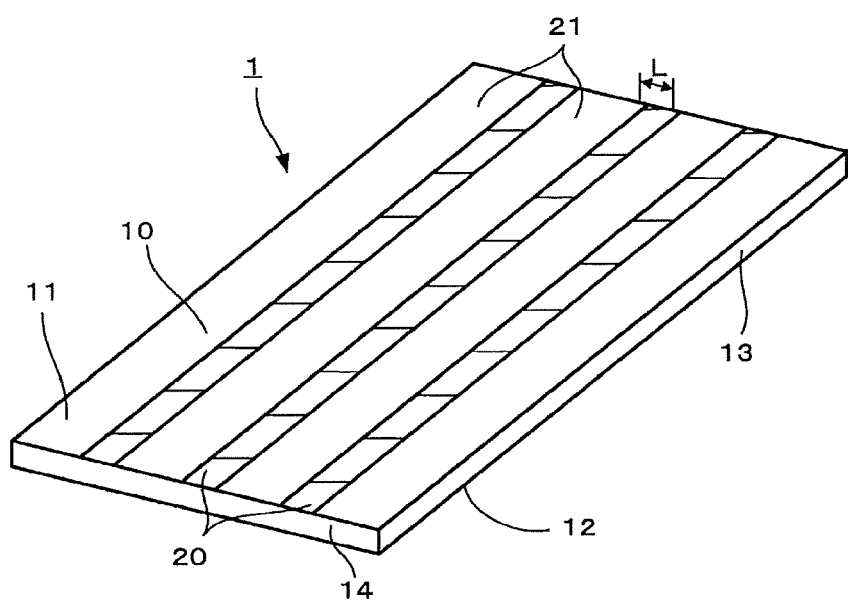

[Fig. 11]

| Treatment Temperature (°C) | Arithmetic mean roughness $Ra_1$ (nm) of roughened region | Arithmetic mean roughness $Ra_2$ (nm) of unroughened region | Ratio of Ra |
|---|---|---|---|
| 500°C | 1.42 | 0.280 | 5.08393 |
| 530°C | 4.10 | 0.280 | 14.6429 |
| 575°C | 9.950 | 0.297 | 33.5017 |
| 600°C | 6.57 | 0.25 | 26.3855 |
| 625°C | 14.50 | 0.294 | 49.3197 |

[Fig. 12]
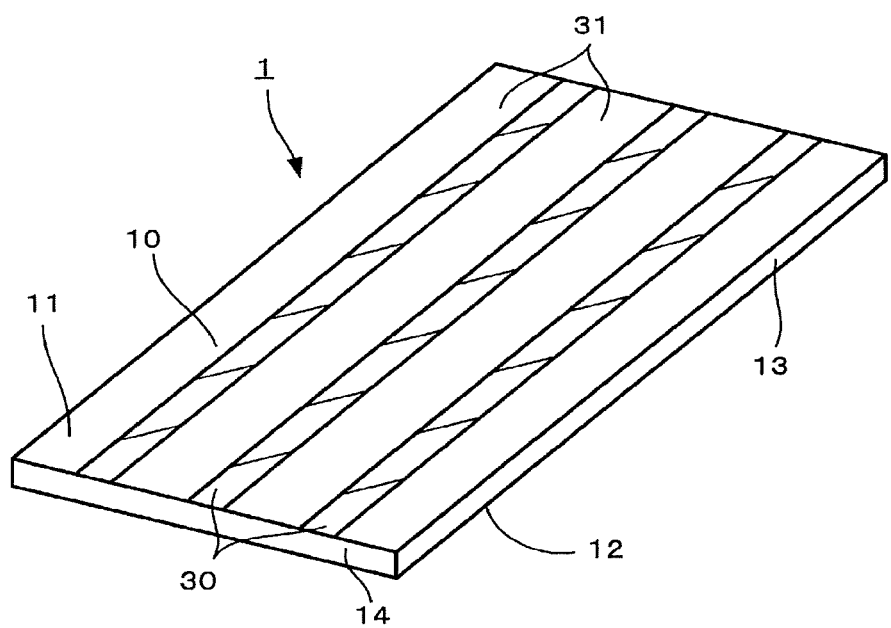

[Fig. 13]
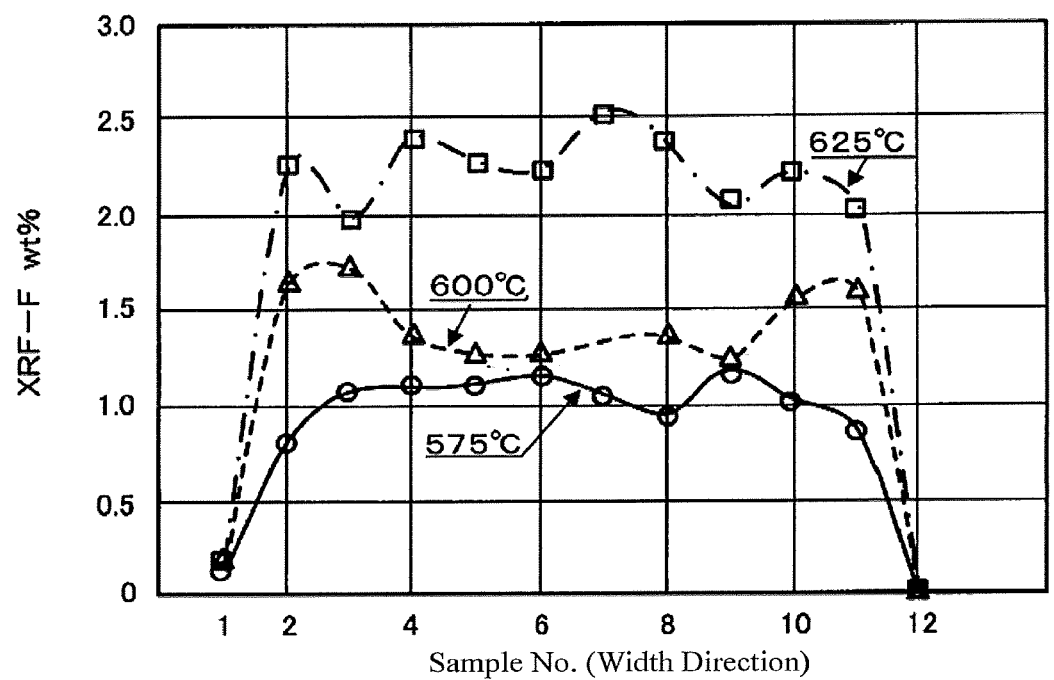

[Fig. 14]

| Treatment Temperature (°C) | F (wt%) Second Region | F (wt%) First Region | Ratio of F Concentration | F Slope (wt%/mm) |
|---|---|---|---|---|
| 500°C | 0.0954737 | 0.83 | 8.73312 | 0.025286049 |
| 575°C | 0.0757503 | 1.0873361829 | 14.3546 | 0.0271022272 |
| 600°C | 0.11 | 1.37 | 12.5668 | 0.0575992328 |
| 625°C | 0.1018548 | 2.26 | 22.2274 | 0.083116728 |

[Fig. 15]
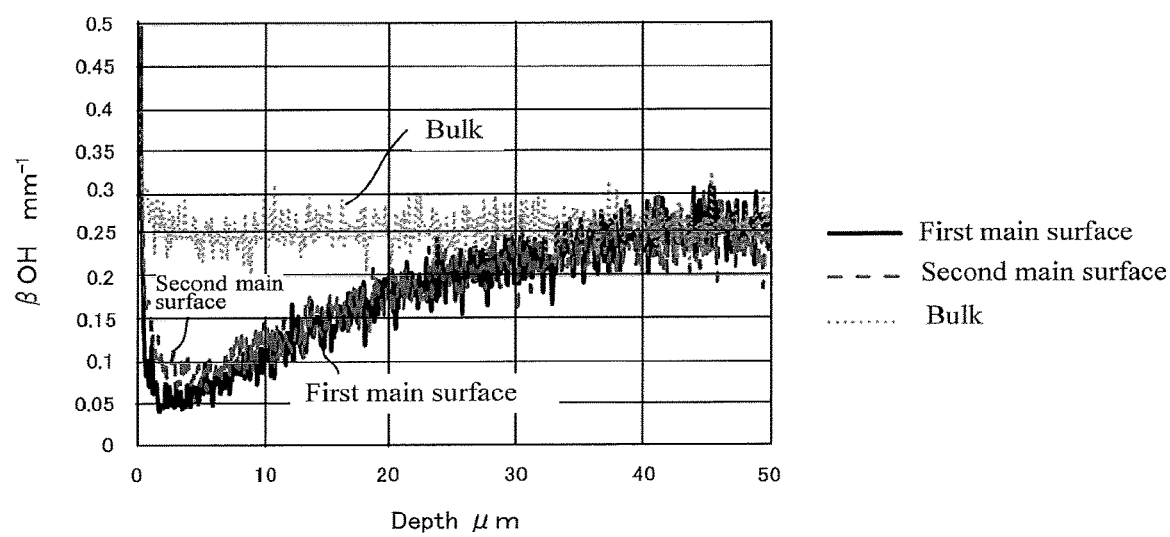

GLASS SUBSTRATE

TECHNICAL FIELD

The present invention relates to a glass substrate.

BACKGROUND ART

Flat display panels such as liquid crystal displays are fabricated by arranging a pair of glass substrates that has components or structures such as micro electrodes or dividing walls formed on surfaces thereof, to make them facing each other. For glass substrates for flat display panels, an application of a manufacturing process of a thin film transistor (TFT), where various films are evenly applied to surfaces thereof and components or structures are formed on the glass substrates through exposure and development using a technique of photo process, is common. As a glass substrate for that, for example, PTL 1 discloses a glass substrate which is a glass sheet in size of 300 mm×300 mm or more, and in which the absolute value of the thickness difference between the thickness measured at a reference point and the thickness measured at a location 20 mm distant from the reference point in X and/or Y directions is 3 µm or less.

PRIOR ART DOCUMENT

Patent Literature

[PTL 1] JP-A-2009-155136

SUMMARY OF THE INVENTION

Problems that the Invention is to Solve

Currently, there is a need to more accurately and/or quickly form components and structures on a glass substrate. However, this cannot be achieved with current techniques.

The present invention is intended to provide a glass substrate on which components and structures can be more accurately and/or quickly formed.

Means for Solving the Problems

A glass substrate comprising a rectangular glass sheet having a first main surface and a second main surface opposite the first main surface, the glass substrate having a first side and a second side which are adjacent to each other in a view along a thickness direction of the glass sheet, in which a thickness tolerance is less than 6.26 µm in a first cross section which is a cross section in the thickness direction of the glass sheet along a straight line parallel to the first side, the thickness tolerance being a difference between the maximum value and the minimum value of the thickness of the glass sheet.

Advantageous Effect of the Invention

The present invention has enabled providing a glass substrate having a large glass sheet and a small thickness tolerance, and that makes it easier to adjust a focal point in, for example, an exposure process in a production line.

BRIEF DESCRIPTION OF DRAWINGS

FIG. 1 illustrates First Embodiment of a glass substrate for TFT according to the present invention, in which (a) of FIG. 1 is a front perspective view, (b) of FIG. 1 is a cross sectional view at A-A of (a), and (c) of FIG. 1 is a schematic view enlarging a portion B of (b).

FIG. 2 is a schematic view of an example of a float glass producing apparatus for the glass substrate for TFT according to the present invention.

FIG. 3 is a schematic view of a convex portion that occurs in the production of the glass substrate for TFT according to the present invention.

FIG. 4 illustrates the convex portion of FIG. 3 in detail, in which (a) of FIG. 4 is a front perspective view of the glass sheet, and (b) of FIG. 4 is an explanatory diagram illustrating etching of the convex portion.

FIG. 5 is a schematic view of an injector disposed in the float glass producing apparatus for the glass substrate for TFT according to the present invention.

FIG. 6 is a schematic view of a beam provided as an injector that is long along the width direction of the glass sheet, in which (a) of FIG. 6 is a block diagram illustrating the whole beam, and (b) to (d) of FIG. 6 are schematic views illustrating the flow of HF gas in three gas lines.

FIG. 7 is a graph plotting the measured thickness tolerance of the first cross section in the glass substrate for TFT according to the present invention and in Comparative Examples.

FIG. 8 is a graph plotting the measured thickness tolerance of every cross section in the glass substrate for TFT according to the present invention and in Comparative Examples.

FIG. 9 is a graph comparing the mean value of the absolute values of first differential values of a thickness of a first cross section in the glass substrate for TFT according to the present invention and in Comparative Examples.

FIG. 10 is a front perspective view illustrating Second Embodiment of the glass substrate for TFT according to the present invention.

FIG. 11 is a table showing roughness ratios at different processing temperatures in the glass substrate for TFT according to the present invention.

FIG. 12 is a front perspective view illustrating Third Embodiment of the glass substrate for TFT according to the present invention.

FIG. 13 is a graph plotting the measured fluorine contents in a first region and in a second region at different processing temperatures in the glass substrate for TFT according to the present invention.

FIG. 14 is a table showing the results of calculations based on FIG. 13.

FIG. 15 is a graph plotting the measured β-OH amounts in the first main surface and in the second main surface in the glass substrate for TFT according to the present invention.

MODE FOR CARRYING OUT THE INVENTION

The glass substrate of the present invention is described below by exemplifying specific embodiments of a glass substrate for TFT with reference to the accompanying drawings.

As illustrated in FIG. 1, a glass substrate 1 for TFT of the present embodiment is configured from a rectangular glass sheet 10 that has a first main surface 11, and a second main surface 12 opposite to the first main surface 11. The glass substrate 1 for TFT also has a first side 13 which joins the first main surface 11 and the second main surface 12 each other, and a second side 14 adjacent the first side 13. The first side 13 and the second side 14 are adjacent to each other in a view along a thickness direction of the glass sheet 10. The glass substrate 1 for TFT of the present embodiment is configured from a large glass sheet 10 in which the first side 13 and the second side 14 have a length of at least 1,200 mm. As used herein, "in a view along a thickness direction of the glass sheet 10" means planar view. The term "rectangular" as used herein is not intended to mean only a rectangular shape in a strict sense, and may encompass shapes in which adjacent two sides cross at a range of angles 10° to 170°, and shapes with their four corners chamfered in a curved or an angular shape. In the case of rectangular shape in a strict sense, the first side 13 and the second side 14 cross each other vertically.

For efficiency, it has been common practice to produce a plurality of glass substrates by dividing such a large glass sheet 10 into smaller portions in a post-process. In this process, the necessary TFTs are formed on individual glass substrates still in the form of a large glass sheet 10, taking into account the dividing lines along which the large glass sheet 10 is to be cut. However, even a small slope in the glass surface of the large glass sheet 10 causes a large thickness difference between opposite ends. Thickness variation occurs in various parts of the glass sheet 10 as the size of the glass sheet 10 increases, because, the larger the glass sheet, the more likely that defects such as waviness occur in the glass sheet under the influence of various factors of the manufacturing process. It is also highly difficult to remove such a thickness difference or variation by polishing the glass surface.

In a TFT forming process, a focal point needs to be adjusted to fall on a glass surface or other objects, using an exposure device. However, this is problematic in the case of the large glass sheet 10 having the foregoing issues. Specifically, the glass sheet 10 necessitates an exposure device to make frequent and fine adjustments of focal point against surface irregularities of the glass sheet 10, and does not permit a high-speed process. When irregularities are too steep, the exposure device cannot accommodate to such changes in adjusting the focal point, and the accuracy of TFT formation decreases.

In PTL 1, irregularities with a height of 3 μm or more may occur over a range of 20 mm or less, and this may cause a decrease of processing speed and accuracy as described above. It is also not always sufficient to simply specify a local thickness difference between a reference point and locations 20 mm distant from the reference point in a TFT forming process that exposes the whole main surface of a glass sheet.

In the present embodiment, the second main surface 12 of the glass sheet 10 is the semiconductor device-forming surface of the glass substrate 1 for TFT. The first main surface 11 is the glass surface opposite to the semiconductor device-forming surface, and is the surface that is anchored to a suction stage by vacuum suction when forming a semiconductor device.

The glass sheet 10 has a first cross section 15 along a straight line parallel to the first side 13, cutting the glass sheet 10 in a direction of thickness W (see (b) of FIG. 1). In a schematically enlarged view of the first main surface 11 of the first cross section 15, the first main surface 11 is a surface with continuous irregularities, and the thickness W of the glass sheet 10 has a maximum value Wmax and a minimum value Wmin (see (c) of FIG. 1). The thickness W is measured by laser displacement meter (SI-F80, manufactured by KEYENCE CORPORATION). For measurement pitch, both of minor axis and major axis are set to 20 mm. The glass sheet 10 has a thickness W of, for example, 1.0 mm or less. That is, the glass sheet 10 of the glass substrate 1 for TFT is large and thin. The thickness W is, for example, 0.01 mm or more. The first cross section 15 is not limited to a specific cross section, and may be any cross section taken along a straight line parallel to the first side 13. In (c) of FIG. 1, the second main surface 12 is shown as a smooth surface for the purpose of explanation; however, the second main surface 12 may have irregularities, as does the first main surface 11. In the case where the first main surface 11 and the second main surface 12 have irregularities, an average height within a range of 20 μm which is a measurement diameter of the displacement meter is determined as a thickness.

The glass substrate 1 for TFT of the present embodiment is preferably alkali-free glass. Preferably, the alkali-free glass contains, by mass in terms of an oxide, 50 to 73% of $SiO_2$, 10.5 to 24% of $Al_2O_3$, 0.1 to 12% of $B_2O_3$, 0 to 8% of MgO, 0 to 14.5% of CaO, 0 to 24% of SrO, 0 to 13.5% of BaO, and 0 to 5% of $ZrO_2$ and the total content of MgO, CaO, SrO, and BaO (MgO+CaO+SrO+BaO) is 8 to 29.5%.

Preferably, the alkali-free glass contains, by mass in terms of an oxide, 58 to 66% of $SiO_2$, 15 to 22% of $Al_2O_3$, 5 to 12% of $B_2O_3$, 0 to 8% of MgO, 0 to 9% of CaO, 3 to 12.5% of SrO, and 0 to 2% of BaO and the total content of MgO, CaO, SrO, and BaO (MgO+CaO+SrO+BaO) is 9 to 18%.

Preferably, the alkali-free glass contains, by mass in terms of an oxide, 54 to 73% of $SiO_2$, 10.5 to 22.5% of $Al_2O_3$, 0.1 to 5.5% of $B_2O_3$, 0 to 8% of MgO, 0 to 9% of CaO, 0 to 16% of SrO, and 0 to 2.5% of BaO and the total content of MgO, CaO, SrO, and BaO (MgO+CaO+SrO+BaO) is 8 to 26%.

In the case of alkali-free glass, TFTs and other devices formed on the glass surface will not be adversely affected by an alkali component, which might otherwise dissolve out of the glass sheet 10 over time. As used herein, "alkali-free" is not intended to mean totally free of an alkali component in a strict sense, but is a concept that permits inclusion of some alkali component as impurities. Specifically, for example, inclusion of about 0.01 mass % of an alkali component is acceptable.

FIG. 2 is a schematic view illustrating an exemplary method of production of the glass substrate 1 for TFT according to the present embodiment. The glass substrate 1 for TFT according to the present embodiment is produced in the following manner. Various glass materials are prepared in appropriate amounts, and thermally melted. These are then homogenized by using a method such as degassing and stirring, and molded into a sheet shape using a known technique such as floating, a downdraw process (for example, a fusion process), and pressing. The resulting glass sheet is slowly cooled, and cut into a product of the desired size. The present embodiment is described through the case where the glass substrate 1 for TFT is produced by using a floating method.

A float glass producing apparatus 100 illustrated in FIG. 2 includes a melting device 110 that melts a raw glass material 2 into molten glass 3, a molding device 120 that receives the molten glass 3 from the melting device 110, and molds the molten glass 3 into a glass ribbon 4 of a belt-like shape, and a slow-cooling device 130 that slowly cools the glass ribbon 4 molded in the molding device 120.

The melting device 110 includes a glass melting vessel 111 that contains the molten glass 3, and a burner 112 that produces flame above the molten glass 3 contained in the glass melting vessel 111. The raw glass material 2 introduced into the glass melting vessel 111 gradually melts into the molten glass 3 under the radiation heat of the flame produced by the burner 112. The molten glass 3 is continuously supplied to the molding device 120 from the glass melting vessel 111.

The molding device 120 includes a bath 122 that contains molten tin 121. In the molding device 120, the molten glass 3 continuously supplied onto the molten tin 121 flows on the molten tin 121 in a predetermined direction, and forms the belt-like glass ribbon 4. The atmospheric temperature inside the molding device 120 decreases from the inlet to the outlet of the molding device 120. The atmospheric temperature inside the molding device 120 is adjusted by a heater or the like (not illustrated) provided in the molding device 120. The glass ribbon 4 cools as it flows in the predetermined direction, and is pulled out from the molten tin 121 in a downstream region of the bath 122. The glass ribbon 4 pulled out from the molten tin 121 is transported to the slow-cooling device 130 with lift-out rolls 140.

The slow-cooling device 130 slowly cools the glass ribbon 4 molded in the molding device 120. The slow-cooling device 130 includes, for example, a slow-cooling furnace (lehr) 131 of an adiabatic structure, and a plurality of transport rolls 132 arranged in the slow-cooling furnace 131, and that transports the glass ribbon 4 in a predetermined direction. The atmospheric temperature inside the slow-cooling furnace 131 decreases from the inlet to the outlet of the slow-cooling furnace 131. The atmospheric temperature inside the slow-cooling furnace 131 is adjusted by a plurality of heaters 133 or the like provided in the slow-cooling furnace 131. Inside of the slow-cooling device 130 is also provided with an injector 200 that blows an etching gas (described later) onto the glass ribbon 4.

The glass ribbon 4 transported through the outlet of the slow-cooling furnace 131 is cut into a predetermined size with a cutting machine, and shipped as the glass substrate 1 for TFT configured from the glass sheet 10. Before shipping, at least one surface of the glass substrate 1 for TFT may be polished and washed, as required.

In the above mentioned exemplary manufacture of the glass sheet 10 using the float glass producing apparatus 100, irregularities may occur on surfaces of the glass sheet 10 because of the unique individual tendency of the manufacturing apparatus. Specifically, as shown in FIG. 3, there are cases where a convex portion 16, appearing like a line, occurs in one or more widthwise parts of the glass sheet 10 as the glass sheet moves from the molding device 120 to the slow-cooling device 130. As shown in FIG. 4, the convex portion 16 often occurs in the form of a line in a direction parallel to the first side 13 of the glass sheet 10. In FIGS. 3 and 4, the convex portion 16 is shown as being parallel to the first side 13. However, the convex portion 16 is not limited to this. Specifically, the line is not necessarily required to be parallel to the first side 13, and may be interrupted or partially missing, or may be misaligned either continuously or discontinuously.

The injector 200 is provided to blow an etching gas to the irregularities, the convex portion 16 or the like formed on the glass ribbon 4, in the slow-cooling device 130 of the float glass producing apparatus 100 so that the surface irregularities and the convex portion 16 can be etched to provide a smooth surface (see (b) of FIG. 4).

FIG. 4 shows an example in which the convex portion 16 is formed only on the first main surface 11. However, the invention is not limited to this. Specifically, the convex portion 16 may be formed only on the second main surface 12, or on both the first main surface 11 and the second main surface 12. Preferably, the injector 200 is provided on the side of the first main surface 11 when the convex portion 16 occurs on the first main surface 11, and on the side of the second main surface 12 when the convex portion 16 occurs on the second main surface 12, so that the injector 200 can serve its purpose irrespective of whether the convex portion is on which surface of the glass sheet 10.

When the convex portion 16 occurs on the first main surface 11, the convex portion 16 may produce a new convex portion on the second main surface 12 upon anchoring the first main surface 11 by applying suction in the TFT forming process. It is accordingly preferable to minimize the surface irregularities of the glass sheet, regardless of whether the surface is a semiconductor device-forming surface. In this way, components and structures can be more accurately and/or quickly formed on the second main surface 12 even when the convex portion 16 on the first main surface 11 is removed.

The following describes the injector 200, with reference to FIG. 5. FIG. 5 shows an example of the injector 200.

The injector 200 includes a supply hole 201 through which an etching gas such as a hydrogen fluoride (HF) gas is blown onto the glass ribbon 4, and a discharge hole 202 that discharges the etching gas. In this example, two discharge holes 202 are provided per one supply hole 201, on the both sides thereof.

The gas (etching gas) blown onto the surface of the glass ribbon 4 through the supply hole 201 of the injector 200 moves inside a channel 203, and discharges through the discharge hole 202. Here, the channel 203 represents the direction of gas flow in forward direction (direction of arrow A), which is in the same direction as the direction of movement of the glass ribbon 4 (arrow A), or in reverse direction opposite the forward direction. In a two-way flow type, the channel 203 connecting the supply hole 201 to the discharge hole 202 equally channels into the forward direction and the reverse direction with respect to the direction of movement of the glass ribbon 4.

The distance D between the bottom of the supply hole 201 of the injector 200 and the glass ribbon 4 is preferably 50 mm or less. With a distance D of 50 mm or less, diffusion of gas in the atmosphere can be reduced, and the gas can reach the surface of the glass ribbon 4 in sufficient amounts relative to the desired amount. When the distance between the bottom of the supply hole 201 and the glass ribbon 4 is too short, the glass ribbon 4 may contact the injector 200 as the glass ribbon 4 fluctuates its position when being processed, for example, on the line in the floating method.

The injector 200 may be used in a one-way or a two-way configuration, and the surface of the glass ribbon 4 may be treated with two or more injectors 200 serially disposed along the transport direction of glass.

In the surface treatment of the glass ribbon 4 with an etching gas such as a hydrogen fluoride (HF) gas blown onto the glass ribbon 4 being transported in the float glass producing apparatus 100, the gas may be supplied from the side that does not contact the transport rolls 132, or through the space between the adjacent transport rolls 132 on the side that contacts the transport rolls 132, for example, when the glass ribbon 4 is transported on the transport rolls 132 as illustrated in FIG. 2.

It is also possible to provide two or more conveyers in series, and dispose the injector 200 between the adjacent conveyers. In this case, the surface of the glass ribbon 4 may be treated by supplying the gas from the side that contacts the conveyers. The gas also may be supplied from the side that does not contact the conveyers when the glass ribbon 4 is transported on the conveyers. It is also possible to use a mesh material, for example, a mesh belt, for the conveyer belt, and the gas may be supplied from the side that contacts the conveyer exposing a part of the glass ribbon 4.

The distance D between the supply hole 201 of the injector 200 and the glass ribbon 4 is preferably 5 to 50 mm. The distance D is more preferably 8 mm or more. The distance D is more preferably 30 mm or less, further preferably 20 mm or less. With a distance D of 5 mm or more, the injector 200 can be prevented from contacting the surface of the glass ribbon 4 even when the glass ribbon 4 shakes in response to external events such as an earthquake. With a distance D of 50 mm or less, diffusion of gas inside the apparatus can be reduced, and the gas can reach the top surface of the glass ribbon 4 in sufficient amounts relative to the desired amount.

The gas has a flow rate (linear velocity) of preferably 20 to 300 cm/s. With a flow rate (linear velocity) of 20 cm/s or more, the HF-containing gas can stably flow, and treat the glass surface in a uniform fashion. The flow rate (linear velocity) is more preferably 50 cm/s or more, further preferably 80 cm/s or more.

As illustrated in FIG. 2, when the glass substrate 1 for TFT of the present embodiment is produced on the line, diffusion of gas inside the slow-cooling device can be reduced, and the gas can reach the top surface of the glass ribbon 4 in sufficient amounts when the flow rate (linear velocity) is 300 cm/s or less. The flow rate (linear velocity) is more preferably 250 cm/s or less, further preferably 200 cm/s or less.

Desirably, the injector 200 is disposed against a predetermined target surface (for example, such as the irregularities, and the convex portion 16). For example, when the convex portion 16 occurs in three locations as illustrated in FIG. 3, it is desirable to dispose the injector 200 for each of these convex portions 16 (at a total of three locations).

It is also possible to provide a long injector along the width of the glass sheet, and the gas may be blown against different portions as may be appropriately adjusted according to the convex portions 16. For example, (a) of FIG. 6 illustrates a cross sectional view of a beam 302 that adjusts the amount of HF gas in three divided regions I, II, and III in width direction X of the glass ribbon 4. The beam 302 is an injector that is long along the width of the glass sheet, and is configured as though the injector 200 of FIG. 5 is stretched in a direction perpendicular to the plane of the paper. The gas lines 311 to 313 are divided by dividing walls 314 and 315, and blow HF gas against the glass through gas blow holes (supply holes) 316. The arrows in (a) of FIG. 6 indicate the direction of HF gas flow. The arrow in (b) of FIG. 6 indicates the direction of HF gas flow in the gas line 311. The arrow in (c) of FIG. 6 indicates the direction of HF gas flow in the gas line 312. The arrow in (d) of FIG. 6 indicates the direction of HF gas flow in the gas line 313.

The injector configuration is not limited to the embodiment illustrated in (a) to (d) of FIG. 6. For example, the injector may have a configuration that is divided into three or more regions with a plurality of dividing walls. By increasing the number of divided regions, it is possible to localize the blown gas, and the gas can be blown against the convex portion 16 with pinpoint accuracy.

The injector also may include a convex portion detection sensor for detecting the location of the convex portion 16, and a dividing wall moving device. With these members, the dividing walls can be adjusted in width direction so that the HF gas can be blown from immediately above the convex portion 16, using convex portion position information from the convex portion detection sensor. Here, the gas line may be provided in the same number as the number of spaces created by dividing the injector with the dividing walls.

As another embodiment, a gas blow hole closing device that closes the unnecessary gas blow hole 316 (a gas blow hole immediately above a location other than the convex portion) may be provided to prevent portions other than the convex portion 16 from being blown by the HF gas in in a single gas blown space. In this case, the gas blow hole closing device may be controlled by deciding which gas blow hole 316 is not needed, using the position information of convex portion 16 from the convex portion detection sensor. In this case, it is not necessarily required to provide a plurality of gas lines and dividing walls.

As another embodiment, an aspiration device that aspirates the HF gas blown through the unnecessary gas blow hole 316 (a gas blow hole immediately above a location other than the convex portion) may be provided to prevent portions other than the convex portion 16 from being blown by the HF gas in a single gas blown space. In this case, the aspiration device may be controlled by deciding which gas blow hole 316 is not needed, using the position information of convex portion 16 from the convex portion detection sensor. In this case, it is not necessarily required to provide a plurality of gas lines and dividing walls.

The method of production of the glass substrate 1 for TFT of the present embodiment may be implemented as an online process or an offline process. As used herein, "online process" refers to a process in which the method of the present embodiment is applied to the slow-cooling process that slowly cools the glass ribbon 4 molded by a process such as floating and the downdraw process. The term "offline process" refers to a process in which the method of the present embodiment is applied to the glass sheet 10 that has been molded and cut into the desired size. Accordingly, the glass sheet 10 in this specification also includes the glass ribbon 4 molded by a process such as floating and the downdraw process, in addition to the glass sheet 10 that has been molded and cut into the desired size.

Preferably, the method of production of the glass substrate 1 for TFT of the present embodiment is implemented as an online process. This is for the following reasons. In contrast to the offline process, the online process requires fewer steps, and the cost is low. In the offline process, the HF-containing gas moves around the glass sheet 10 toward the second main surface 12 where semiconductor devices are to be formed. Such movement of the HF-containing gas can be reduced when the glass ribbon 4 is treated by the online process.

The float glass producing apparatus 100 illustrated in FIG. 2 is adapted to produce the glass substrate 1 for TFT of the present embodiment in the online process. Accordingly, the injector 200 is disposed above the glass ribbon 4 in the slow-cooling device 130, and supplies a hydrogen fluoride (HF)-containing gas to the top surface of the glass ribbon 4. In FIG. 2, the injector 200 is disposed in the slow-cooling device 130. However, the injector 200 may be disposed in the molding device 120, provided that the glass surface receiving the HF-containing gas has a temperature of 500 to 900° C.

In the method of production of the glass substrate 1 for TFT of the present embodiment, a hydrogen fluoride (HF)-containing gas is blown against at least one surface of the glass ribbon 4 for surface treatment. Instead of the hydrogen fluoride gas, a gas or a liquid may be used that contains a molecule having a fluorine atom in its structure.

Examples of the etching gas include hydrogen fluoride (HF), flon (for example, chlorofluorocarbon (CFC), fluorocarbon (FC), hydrochlorofluorocarbon (HCFC), and hydrofluorocarbon (HFC)), halons, hydrogen fluoride (HF), molecular fluorine (F$_2$), trifluoroacetic acid (CF$_3$COOH), tetrafluoromethane (CF$_4$), silicon tetrafluoride (SiF$_4$), phosphorus pentafluoride (PF$_5$), phosphorus trifluoride (PF$_3$), boron trifluoride (BF$_3$), nitrogen trifluoride (NF$_3$), and chlorine trifluoride (ClF$_3$). However, the etching gas is not limited to these gases and liquids. The preferred etching gas is hydrogen fluoride (HF) because of advantages such as cost and well known handling information.

FIG. 7 is a graph showing the results of the measurements of the thickness tolerance (μm) of the first cross section 15 for Example (the glass substrate 1 for TFT of the present embodiment) and Comparative Examples (A to C). In Example, position information of a convex portion was obtained from a glass ribbon measuring 3,500 mm in width, and the convex portion was removed by blowing a HF gas against the position of the convex portion. The gas flow rate was 0.5 m/s, the glass temperature was 625 to 575° C., the gas concentration was 20% HF, and 80% N$_2$, and the process time was about 10 seconds. Because the amount of removed convex portion is linearly related to the HF concentration in the gas and the process time, the convex portion can be removed in an adjusted amount by adjusting these two parameters. Then, the glass ribbon was cut, and the resulting 1,200 mm×1,200 mm glass sheet was used as the glass sheet of Example. Comparative Examples A to C are large glass sheets for TFT in a size of 1,200 mm×1,200 mm or more, and can be obtained from common distribution routes.

FIG. 7 plots the tolerance values determined from the measured thickness data obtained from the first cross section 15 in a 20-mm pitch. The number of dots represents the number of measurements N of the same sample, and each dot represents a value from different first cross sections 15.

It can be understood from the graph that the glass substrate 1 for TFT of the present embodiment has a thickness tolerance of less than 6.26 μm in the first cross section 15 taken along a straight line parallel to the first side 13, the thickness tolerance being the difference between the maximum value Wmax and the minimum value Wmin of the thickness W of the glass sheet 10. Preferably, the thickness tolerance is 6.0 μm, 5.8 μm, 5.5 μm, 5.3 μm, or 5.0 μm or less. The lower limit is, for example, 1.0 μm or more, though it is not limited.

As described above, the exposure process in a TFT production line requires a glass sheet 10 with a small thickness tolerance to help the exposure device adjusts the focal point. In the glass substrate 1 for TFT of the present embodiment, the lengths of the first side 13 and the second side 14 of the glass sheet 10 are at least 1,200 mm. The glass sheet 10 of this size having a thickness tolerance of less than 6.26 μm is not currently available, and the glass substrate 1 for TFT of the present embodiment enables accurately and/or quickly forming components and structures.

The very small thickness tolerance of the first cross section 15 is the result of the etching gas smoothing the convex portion 16 or the like created by the unique individual tendency of the glass sheet manufacturing apparatus, and it means that the thickness W has only small changes.

FIG. 8 is a graph plotting the thickness tolerance (μm) measured in every cross section of the glass sheet 10 throughout the glass sheet surface for Example (glass substrate 1 for TFT of the present embodiment) and Comparative Examples (A to C).

FIG. 8 plots the tolerance values determined from the measured thickness data from more than one measurement point in a 20-mm pitch in cross sections in the thickness direction of the arbitrarily selected glass sheet. The number of dots represents the number of measurements N of the same sample, and each dot represents a value from randomly selected different cross sections.

It can be understood from the graph that the glass substrate 1 for TFT of the present embodiment has a thickness tolerance of less than 7.12 μm in every cross section in the thickness direction of the glass sheet. Small thickness tolerances are observed in every cross section. The present embodiment thus enables providing a glass substrate 1 for TFT that has a large glass sheet 10 having a small thickness tolerance in every cross section, and with which components and structures can be accurately and/or quickly formed in the production of TFTs.

The thickness tolerance is preferably 7.0 μm or less, more preferably 6.5 μm or less, further preferably 6.0 μm or less. The lower limit is, for example, 1.0 μm or more, though it is not limited.

FIG. 9 is a graph comparing the mean values of the absolute values of first differential values of the thickness W of the first cross section 15 of the glass sheet 10 for Example (glass substrate 1 for TFT of the present embodiment) and Comparative Examples (A to C).

The plots of FIG. 9 are based on the measured thickness data from more than one measurement point of the first cross section 15 in a 20-mm pitch. That is, the first differential value represents a slope of thickness changes in each pitch. The number of dots represents the number of measurements N of the same sample, and each dot represents a value from different first cross sections 15.

It can be understood from the graph that, in the glass substrate 1 for TFT of the present embodiment, the mean value of the absolute values of the first differential values of the thickness W in the first cross section 15 is less than 1.72E-02. The absolute value of the first differential value of thickness W indicates the extent of a change (slope) of thickness W along the first cross section 15, a smaller mean value of the absolute values in the first cross section 15 means a smaller change (a smaller slope). That is, the glass surface has fewer irregularities, and is smooth. When the mean value of the absolute values of the first differential values of thickness W is 1.72E-02 or more, it means that the irregularities change on the glass sheet surface is too steep. The exposure device thus takes a longer time to adjust the focal point, and the accuracy of TFT formation tends to decrease as a result of a failure to sufficiently adjust the focal point. The present embodiment enables providing a glass substrate 1 for TFT with which components and structures can be accurately and/or quickly formed in the production of TFTs.

The mean value of the absolute values of the first differential values of thickness W is preferably 1.7E-02 or less, more preferably 1.6.5E-02 or less, further preferably 1.6E-02 or less. The lower limit is, for example, 5.0E-03 or more, though it is not limited.

In the glass substrate 1 for TFT of the present embodiment, the standard deviation of the absolute values of the first differential values of the thickness W in the first cross section 15 is 1.5E-03 or less. The standard deviation of the absolute values of the first differential values of thickness W represents the extent of a change (slope) of thickness W along the first cross section 15. A smaller standard deviation of absolute values in the first cross section 15 means that the change (slope) is smaller, and that the surface has fewer irregularities, and is smooth.

The standard deviation of the absolute values of the first differential values of thickness W is preferably 1.4E-03 or less, more preferably 1.3E-03 or less. The lower limit is, for example, 1.0E-04 or more, though it is not particularly limited.

In the glass substrate 1 for TFT of the present embodiment, the maximum value of the absolute values of the second differential values of the thickness W in the first cross section 15 is 6.0E-03 or less, preferably 5.8E-03 or less, more preferably 5.5E-03 or less. The lower limit is, for example, 1.0E-03 or more, though it is not particularly limited. A smaller maximum value of the absolute values of the second differential values of thickness W means that the inflection point of the thickness is flatter. That is, it means that the blowing of the etching gas has formed a smooth surface. This makes it easier to adjust the focal point, particularly when a plurality of separate exposure devices is used. The present embodiment thus enables providing a glass substrate 1 for TFT with which components and structures can be accurately and/or quickly formed in the production of TFTs.

In the glass substrate 1 for TFT of the present embodiment, the standard deviation of the absolute values of the second differential values of the thickness W in the first cross section 15 is 1.5E-04 or less, preferably 1.4E-04 or less, more preferably 1.3E-04 or less, further preferably 1.2E-04 or less. The lower limit is, for example, 5.0E-06 or more, though it is not particularly limited. An extremely small standard deviation of the absolute values of the second differential values of thickness W means that there is not a particularly large protrusion, and that the thickness W of the glass sheet 10 has a small change. That is, the blowing of the etching gas has formed a smooth surface.

In the first cross section 15, the glass sheet surface is smooth throughout the glass sheet 10 when the first cross section 15 has extremely small values for the standard deviation of the absolute values of the first differential values of thickness W, the maximum value of the absolute values of the second differential value, and the standard deviation of the absolute values of the second differential values. A smooth glass sheet surface throughout the glass sheet 10 makes it easier to adjust the focal point in, for example, the exposure process in a TFT production line, and to provide a large glass substrate 1 for TFT that is desirable in terms of productivity and quality.

FIG. 10 is a front perspective view illustrating Second Embodiment of the glass substrate for TFT of the present invention. Second Embodiment is described below with reference to FIG. 10.

In a glass substrate 1 for TFT of Second Embodiment, a roughened region 20 and an unroughened region 21 of predetermined widths are formed on the first main surface 11 of the glass sheet 10. The roughened region 20 is an etching gas-applied region having a width L parallel to the second side 14. For example, the roughened region 20 may be a smooth region formed by removing the convex portion 16. The unroughened region 21 is a region where the etching gas was not applied. The roughened region 20 does not necessarily involve removal of the convex portion 16. For example, the glass sheet surface can be roughened by adjusting the amount of blown etching gas, or the glass temperature, without involving almost any thickness reduction. It is not necessarily required to smooth the glass sheet 10.

IN TFT production, the first main surface 11 of the glass sheet 10 is anchored by applying suction. However, this can be problematic because static electricity easily accumulates on the first main surface 11, and holds the glass sheet 10 even after the glass sheet 10 is released from suction. This may cause cracking in the glass sheet 10. The static electricity accumulated on the glass sheet 10 may also cause a defect in the TFT device formed. The roughened region 20 is formed on the first main surface 11 to prevent these problems. Specifically, accumulation of static electricity can be reduced to prevent electrification by partially forming a region of a large surface roughness.

In the roughened region 20 that had etching-gas application, a predetermined roughness Ra can be imparted while greatly reducing the thickness tolerance in direction of thickness W when, for example, smoothing the surface by etching away the convex portion 16 or the like. In this way, a glass substrate 1 for TFT having a large glass sheet 10 can be provided with which electrification can be prevented, and components and structures can be accurately and/or quickly formed in the production of TFTs. The roughness Ra is measured by Atomic Force Microscope (Dimension Icon, manufactured by Bruker) under a condition of Scan Asyst mode, scan size: 5 μm×5 μm, scan rate: 0.977 Hz. Then, arithmetic mean roughness (Ra) within the above described range is calculated after correcting a secondary slope.

In Second Embodiment, the roughened region 20 having a predetermined width L is formed in the form of a line parallel to the first side 13 of the glass sheet 10. Any number of roughened regions 20 may be provided. A plurality of roughened regions 20 may be formed in the form of a line parallel to the first side 13.

FIG. 11 is a table showing the roughness $Ra_1$ of the roughened region 20, the roughness $Ra_2$ of the unroughened region 21, and the ratio of roughness Ra (a ratio of $Ra_1$ to $Ra_2$) at different processing temperatures (° C.). The processing temperature (° C.) is the temperature of the atmosphere around the glass being subjected to etching-gas application in the manufacturing process. The roughness $Ra_1$ and the roughness $Ra_2$ are mean values of roughness values measured at ten measurement points in the roughened region and in the unroughened region.

It can be understood from the table that the ratio of roughness Ra of the roughened region 20 to the unroughened region 21 is larger than 1 in the glass substrate 1 for TFT of the present embodiment. The ratio of roughness is preferably 3 or more, more preferably 10 or more, further preferably 20 or more. The upper limit is, for example, 100 or less, though it is not particularly limited. By confining the ratio of roughness Ra in these ranges, accumulation of static electricity can be reduced, and electrification can be prevented not only in the roughened region, but throughout the glass sheet.

It can be understood that, in the glass substrate 1 for TFT of the present embodiment, the arithmetic mean roughness $Ra_1$ of the roughened region 20 and the arithmetic mean roughness $Ra_2$ of the unroughened region 21 satisfy the following relationships, $Ra_1 > 0.5$ nm; and
$Ra_2 \leq 0.5$ nm.

$Ra_1$ is preferably 1.0 nm or more, more preferably 3.0 nm or more, further preferably 5.0 nm or more. The upper limit is, for example, 50 nm or less, preferably 30 nm or less, more preferably 20 nm or less, though it is not particularly limited. The lower limit of $Ra_2$ is, for example, 0.2 nm or more, though it is not particularly limited. With the arithmetic mean roughness $Ra_1$ of the roughened region 20, and the arithmetic mean roughness $Ra_2$ of the unroughened region 21 falling in these ranges, accumulation of static electricity can be reduced, and electrification can be prevented not only in the roughened region, but throughout the glass sheet, making it possible to accurately and/or quickly form components and structures in the production of TFTs.

In the glass substrate 1 for TFT of the present embodiment, the roughened region 20 has a smaller area than the unroughened region 21, and the ratio of area of unroughened region 21 to roughened region 20 is 3 to 300. An efficient surface treatment of the glass sheet 10 is possible by blowing the etching gas only to the necessary portions, and this makes it possible to prevent electrification, and to accurately and/or quickly form components and structures in TFT production.

For example, when blowing the gas over a 400-mm width in a glass sheet 10 having the first side 13 measuring 1,200 mm in length, the ratio of area of unroughened region 21 to roughened region 20 is preferably 5 or more, or 10 or more, more preferably 20 or more. For example, when blowing the gas over a 10-mm width in a glass sheet 10 having the first side 13 measuring 3,000 mm in length, the ratio of area of unroughened region 21 to roughened region 20 is preferably 280 or less, more preferably 250 or less, further preferably 230 or less. An efficient surface treatment of the glass sheet 10 is possible by treating only the necessary portion of the glass sheet 10. A smooth glass sheet can be obtained when the process involves removal of the convex portion 16.

The roughened region 20 has a width L of 10 mm to 1,000 mm in a direction parallel to the second side 14. The width L is preferably 20 mm or more, more preferably 30 mm or more, further preferably 50 mm or more, and is preferably 900 mm or less, more preferably 800 mm or less, further preferably 700 mm or less. An efficient surface treatment of the glass sheet 10 is possible by treating only the necessary portion of the glass sheet 10. A smooth glass sheet can be obtained when the process involves removal of the convex portion 16. When more than one roughened region 20 is present, the width L means the width of one roughened region 20, not the total width.

FIG. 12 is a front perspective view illustrating Third Embodiment of the glass substrate for TFT of the present invention. Third Embodiment is described below with reference to FIG. 12.

In a glass substrate 1 for TFT of Third Embodiment, a first region 30 and a second region 31 of predetermined widths are formed on the first main surface 11 of the glass sheet 10. The first region 30 is a region having a width L parallel to the second side 14, and that has undergone application of an etching gas, specifically, a fluorine-containing gas (e.g., HF). The first region 30 has a smooth surface of a predetermined roughness Ra with a reduced thickness tolerance achieved by, for example, removing the convex portion 16. The second region 31 is a region where the fluorine-containing gas was not applied. The first region 30 does not necessarily involve removal of the convex portion 16. For example, fluorine can be imparted to the glass sheet surface by adjusting the amount of blown HF gas, or the glass temperature, without involving almost any thickness reduction. It is not necessarily required to smooth the glass sheet 10.

In Third Embodiment, the first region 30 that has undergone application of the fluorine-containing gas is formed in the form of a line parallel to the first side 13 of the glass sheet 10. Any number of first regions 30 may be provided. A plurality of first regions 30 may be formed in the form of a line parallel to the first side 13.

FIG. 13 is a graph plotting the measured fluorine contents (wt %) in the first region 30 and the second region 31 at different processing temperatures (° C.). The horizontal axis represents sample numbers, in which No. 1 and No. 12 represent the second region 31, and the other numbers (No. 2 to 11) represent the first region 30. The interval is 25 mm for all samples. The processing temperature (° C.) is the temperature of the atmosphere around the glass being subjected to fluorine-containing gas application in the manufacturing process. The fluorine contents is measured by X-ray Fluorescence (ZSX Primus II, manufactured by Rigaku Corporation). Analysis diameter is set to φ 20 mm, and an intensity of F-Kα ray of the glass surface is measured. Then, F concentration of a sample was calculated based on a standard curve obtained from a glass with the same composition in which F concentration is known.

FIG. 14 is a table showing the results of calculations based on the measured values of FIG. 13. The fluorine contents F (wt %) of the first region 30 and the second region 31 are mean values of values from each sample at different processing temperatures. The ratio of F concentration is a value obtained by dividing the F value of the first region 30 by the F value of the second region 31. F slope (wt %/mm) is a value calculated for the slopes of sample No. 1 and No. 2 (value of No. 2/value of No. 1).

It can be understood from the graph of FIG. 13 and the table of FIG. 14 that the ratio of fluorine content (wt %) of first region 30 to second region 31 is larger than 1. The ratio is preferably 3 or more, more preferably 5 or more, further preferably 8 or more. The upper limit is, for example, 40 or less, preferably 35 or less, more preferably 30 or less, further preferably 25 or less, though it is not particularly limited. When fluorine is inherently absent in the glass composition, the fluorine content of the second region 31 is zero, and the ratio is infinite.

The surface of the first region 30 can be made water and oil repellent with the fluorine-containing gas blown against the first region 30. That is, the first region 30 can be formed as an area where TFT components can be detached with ease. For example, when the first region 30 is formed on the TFT-forming second main surface 12 in the form of a line that matches the dividing line to be used in a later process, any components erroneously formed in the area of the dividing line can be detached with ease.

For example, when the glass surface is smoothed by removing the convex portion 16 with a fluorine-containing etching gas, the resulting glass substrate 1 for TFT having the large glass sheet 10 can have a greatly reduced thickness tolerance in thickness direction W, and fluorine can be imparted to the first region, allowing components and structures to be accurately and/or quickly formed in TFT production, and making the first region water and oil repellent. Because of the region roughened by fluorine, static electricity does not easily accumulate in TFT production, and electrification can be prevented in the glass substrate 1 for TFT.

It can be understood from the graph of FIG. 13 and the table of FIG. 14 that the fluorine content F1 of the first region 30 and the fluorine content F2 of the second region 31 satisfy, 0.5 wt %≤F1≤5 wt %; and 0≤F2≤0.15 wt %.

The lower limit of F1 is preferably 0.8 wt % or more, more preferably 1.0 wt % or more. The upper limit of F1 is preferably 4.0 wt % or less, more preferably 3.0 wt % or less.

The water and oil repellency can be adjusted by setting the fluorine contents F of the first region 30 and the second region 31 in the foregoing ranges. For example, when the process involves smoothing and roughing of the surface, such as removal of the convex portion 16, the glass sheet 10 can have a small thickness tolerance so that the focal point can be more easily adjusted in the exposure process in a TFT production line, and accumulation of static electricity can be reduced, and electrification can be prevented in the glass substrate 1 for TFT.

In the glass substrate 1 for TFT of the present embodiment, the first region 30 has a smaller area than the second region 31, and the ratio of area of second region 31 to first region 30 is 3 to 300. An efficient surface treatment of the glass sheet 10 is possible by blowing the fluorine-containing gas only to the necessary portions. A smooth glass sheet 10 can be obtained when the process involves removal of the convex portion 16.

It can be understood from the table of FIG. 14 that the slope of fluorine content F in a direction parallel to the second side 14 is 0.001 wt %/mm to 0.15 wt %/mm in the first region 30 of the glass substrate 1 for TFT of the present embodiment. The slope is preferably 0.13 wt %/mm or less, more preferably 0.12 wt %/mm or less, further preferably 0.10 wt %/mm or less. An efficient surface treatment of the glass sheet 10 is possible by blowing the fluorine-containing gas only to the necessary portions. A smooth glass sheet can be obtained when the process involves removal of the convex portion 16.

Desirably, the glass sheet 10 of the glass substrate 1 for TFT of the present embodiment does not have a polishing flaw in at least one of the first main surface 11 and the second main surface 12. Preferably, neither of the first main surface 11 and the second main surface 12 has a polishing flaw. The presence or absence of a polishing flaw can be determined by surface observation with an AFM (Atomic Force Microscope). In this specification, the surface is determined as having a polishing flaw when one or more scratches having a length of 5 μm or more are present in a 100 μm×5 μm region. A polishing flaw is absent when this condition is not met. In the absence of a polishing flaw in the first main surface 11 and the second main surface 12, components and structures can be accurately and/or quickly formed in TFT production. It is also possible to increase the surface strength of the glass sheet 10.

FIG. 15 is a graph showing the measured β-OH amounts in the first main surface 11 and the second main surface 12 of the present embodiment.

It can be understood from the graph of FIG. 15 that the glass sheet 10 of the glass substrate 1 for TFT of the present embodiment comprises a layer having a depth of 10 μm or more and containing 80% or less of moisture with respect to the moisture content of a bulk (as measured at the center of thickness direction W), both in the first main surface 11 not in contact with molten tin, and in the second main surface 12 in contact with molten tin.

It can be understood that the a glass sheet comprising a layer having a depth of 10 μm or more and containing 80% or less of moisture with respect to the moisture content of a bulk in at least one of the first main surface 11 and the second main surface 12, is the glass sheet 10 produced by the floating method. The floating method is desirable for obtaining larger glass sheets, and a glass sheet measuring 1200 mm×1,200 mm or more can be produced with ease using the floating method. The size of the glass sheet is preferably 1,500 mm×1,500 mm or more, more preferably 2,000 mm×2,000 mm or more, further preferably 2,500 mm×2,500 mm or more. The length is 1,200 mm to 7,000 mm on at least one side. Glass sheets with larger numbers of TFTs can be obtained from a single glass sheet. The β-OH value representing the moisture content is measured by measuring transmittance with an infrared spectrophotometer, or by secondary ion mass spectrometry (SIMS).

The present invention is not limited to the embodiments described above, and various changes, including modifications and improvements, may be made thereto as appropriate. The materials, shapes, dimensions, numerical values, forms, numbers, locations, and other features of the constituting elements described in the embodiments may be freely selected, and are not limited, provided that the present invention is achievable.

The applicable areas of the flat glass substrate are not limited to glass substrates for TFTs, and the flat glass substrate is demanded in a wide variety of fields. For example, when resin patterns are to be formed by imprinting on a glass surface, the desired patterns may not be obtained in a depressed part of a wavy glass surface when the mold fails to properly apply its pressure on these portions. This is where the flat glass is desirable, allowing a mold to uniformly exert its pressure on the glass surface. As an example, in the case of a rectangular glass, the glass used for imprinting has a size that is 50 mm to 7,000 mm long on at least one side.

While the present invention has been described using certain embodiments of the invention as specific examples of the invention, it will be apparent to a skilled person that various modifications and changes may be made thereto within the spirit and scope of the invention. This patent application is based on Japanese patent application No. 2017-155468 filed Aug. 10, 2017 and Japanese patent application No. 2018-138799 filed Jul. 24, 2018, the contents of which are hereby incorporated by reference.

INDUSTRIAL APPLICABILITY

A glass substrate for TFT of the present invention can improve productivity in a TFT production line, and has other advantages including prevention of electrification, and can be suitably used in applications requiring a large glass sheet having a small thickness tolerance.

REFERENCE SIGNS LIST

1: Glass substrate for TFT
10: Glass sheet
11: First main surface
12: Second main surface
13: First side
14: Second side
15: First cross section
16: Convex portion
20: Roughened region
21: Unroughened region
30: First region
31: Second region
100: Float glass producing apparatus
200: Injector

The invention claimed is:

1. A glass substrate comprising a rectangular glass sheet comprising a first main surface and a second main surface opposite the first main surface,
   wherein the glass substrate comprises a first side and a second side which are adjacent to each other in a view along a thickness direction of the glass sheet,
   wherein a thickness tolerance is less than 6.26 μm in a first cross section which is a cross section in the thickness direction of the glass sheet along a straight line parallel to the first side, wherein the thickness tolerance is a difference between the maximum value and the minimum value of the thickness of the glass sheet, and wherein the first main surface comprises a roughened region and an unroughened region, and a ratio of a roughness of the roughened region to the unroughened region is greater than 1.

2. The glass substrate according to claim 1, wherein the thickness tolerance is less than 7.12 μm in every cross section in the thickness direction of the glass sheet.

3. The glass substrate according to claim 1, wherein a mean value of absolute values of first differential values of the thickness in the first cross section is less than 1.72E-02.

4. The glass substrate according to claim 1, wherein a standard deviation of absolute values of first differential values of the thickness in the first cross section is 1.5E-03 or less.

5. The glass substrate according to claim 1, wherein the maximum value of absolute values of second differential values of the thickness in the first cross section is 6.0E-03 or less.

6. The glass substrate according to claim 1, wherein a standard deviation of absolute values of second differential values of the thickness in the first cross section is 1.5E-04 or less.

7. The glass substrate according to claim 1, satisfying the following relationships:

$Ra_1 > 0.5$ nm; and
$Ra_2 \leq 0.5$ nm,
wherein $Ra_1$ is the arithmetic mean roughness of the roughened region, and $Ra_2$ is the arithmetic mean roughness of the unroughened region.

8. The glass substrate according to claim 1, wherein the roughened region has a smaller area than the unroughened region, and
an area ratio of the unroughened region to the roughened region is from 3 to 300.

9. The glass substrate according to claim 1, wherein the first main surface comprises a linear form roughened region in a direction parallel to the first side.

10. The glass substrate according to claim 1, wherein the first main surface comprises a plurality of linear form roughened regions in a direction parallel to the first side.

11. The glass substrate according to claim 9, wherein the roughened region has a width of from 10 mm to 1,000 mm in a direction parallel to the second side.

12. The glass substrate according to claim 1, wherein the glass sheet is an alkali-free glass.

13. The glass substrate according to claim 1, wherein the glass sheet does not have a polishing flaw in at least one of the first main surface and the second main surface.

14. The glass substrate according to claim 1, wherein the glass sheet has a thickness of 1.0 mm or less.

15. The glass substrate according to claim 1, wherein the glass sheet comprises a layer having a thickness of 10 μm or more and comprising moisture in an amount of 80% or less of a moisture content of a bulk, in at least one of the first main surface and the second main surface.

16. The glass substrate according to claim 1, wherein the first main surface comprises a first region and a second region, and a ratio of a fluorine content in the first region to a fluorine content in the second region is greater than 1.

17. A glass substrate comprising a rectangular glass sheet comprising a first main surface and a second main surface opposite the first main surface,
wherein the glass substrate comprises a first side and a second side which are adjacent to each other in a view along a thickness direction of the glass sheet,
wherein a thickness tolerance is less than 6.26 μm in a first cross section which is a cross section in the thickness direction of the glass sheet along a straight line parallel to the first side, wherein the thickness tolerance is a difference between the maximum value and the minimum value of the thickness of the glass sheet,
wherein the first main surface comprises a first region and a second region, and
a ratio of a fluorine content in the first region to a fluorine content in the second region is greater than 1.

18. The glass substrate according to claim 17, satisfying the following relationships:

0.5 wt % ≤ F1 ≤ 5 wt %; and
0 ≤ F2 ≤ 0.15 wt %,
wherein F1 is the fluorine content of the first region, and F2 is the fluorine content of the second region.

19. The glass substrate according to claim 17, wherein the first region has a smaller area than the second region, and an area ratio of the second region to the first region is from 3 to 300.

20. The glass substrate according to claim 17, wherein the first main surface comprises a linear form first region in a direction parallel to the first side.

21. The glass substrate according to claim 17, wherein the first main surface comprises a plurality of linear form first regions in a direction parallel to the first side.

22. The glass substrate according to claim 20, wherein the first region has a fluorine content having a slope along a direction parallel to the second side of from 0.001 wt %/mm to 0.15 wt %/mm.

* * * * *